United States Patent [19]
Brown

[11] Patent Number: 5,836,519
[45] Date of Patent: Nov. 17, 1998

[54] PORTABLE WHEELED SPRAYING APPARATUS HAVING AN ADJUSTABLE HANDLE

[76] Inventor: Robert S. Brown, 513 Colt Dr., Loveland, Colo. 80537

[21] Appl. No.: 726,324

[22] Filed: Oct. 3, 1996

[51] Int. Cl.⁶ .................................. A61M 11/02
[52] U.S. Cl. .................. 239/373; 239/147; 239/375; 222/401; 220/212.5; 220/672; 220/675; 190/116
[58] Field of Search .................... 239/146, 147, 239/175, 273, 337, 373, 375, 280; 222/401, 402; 220/212, 212.5, 661, 672, 675, 771; 190/39, 115, 116; 4/602, 603

[56] References Cited

U.S. PATENT DOCUMENTS

| | | | |
|---|---|---|---|
| 836,442 | 11/1906 | Dunning | 239/146 |
| 929,597 | 7/1909 | Johnson | 239/146 |
| 2,509,627 | 5/1950 | Bickerton et al. | 239/373 |
| 2,521,313 | 9/1950 | Sproat | 230/235 |
| 2,772,921 | 12/1956 | Nance | 239/373 |
| 2,818,299 | 12/1957 | Payne | 239/373 |
| 2,974,873 | 3/1961 | Joslyn et al. | 239/373 |
| 2,989,244 | 6/1961 | Matthewson | 239/373 |
| 2,989,245 | 6/1961 | Matthewson | 239/175 |
| 3,023,969 | 3/1962 | Hudson et al. | 239/146 |
| 3,064,904 | 11/1962 | Roberts | 239/146 |
| 3,142,443 | 7/1964 | Morgan | 239/373 |
| 3,265,308 | 8/1966 | Hopkins | 239/172 |
| 3,801,015 | 4/1974 | Hayes | 239/175 |
| 3,805,929 | 4/1974 | Kuwayama | 190/115 |
| 3,831,851 | 8/1974 | Gsell et al. | 239/175 |
| 4,135,669 | 1/1979 | Bridges et al. | 239/373 |
| 5,072,669 | 12/1991 | Ellison et al. | 239/373 |
| 5,188,434 | 2/1993 | Ruf et al. | 303/111 |
| 5,234,144 | 8/1993 | Iler | 220/661 |
| 5,350,046 | 9/1994 | Falloon et al. | 190/115 |
| 5,429,306 | 7/1995 | Schneider et al. | 239/154 |
| 5,480,096 | 1/1996 | Wilson | 239/148 |
| 5,615,757 | 4/1997 | Chen | 190/115 |

FOREIGN PATENT DOCUMENTS

A-6-24304  2/1994  Japan .

Primary Examiner—Andres Kashnikow
Assistant Examiner—Lisa Ann Douglas
Attorney, Agent, or Firm—Thomas J. Loran

[57] ABSTRACT

A portable wheeled apparatus for storing and spraying liquids includes a low center of gravity liquid container having generally elliptical shape horizontally extended center section with integral end caps and attached wheels, a pump for supplying air pressure into the container, a carrying handle, and a threaded outlet fitting. A removable handle is provided that adjusts for user height.

1 Claim, 4 Drawing Sheets

PORTABLE WHEELED SPRAYING APPARATUS HAVING AN ADJUSTABLE HANDLE

BACKGROUND OF THE INVENTION

1. Field of the Invention

This invention generally relates to an improved portable wheeled spraying apparatus including a plastic container, an air pump, liquid outlet and handle for carrying, and a removable handle extension providing an easy transport option during use.

2. Description of the Prior Art

Portable sprayers having wheels have been used for many years for spraying insects, weeds, vegetables, plants, trees, and flowers in gardens, yards, and greenhouses. They are also used for spraying other liquids. Most these wheeled sprayers use metal cylinders either vertical or horizontal positioned that are described in U.S. Pat. Nos. 4,135,669; 3,265,308; 3,023,969; 2,989,245; and 2,521,313. These are heavy wheeled metal containers with handles that aid in transport but they are not designed to be carried or transported without an extending handle. Multiple containers cannot easily be transported together because of the designs. The shapes are limited because of the metal construction and therefore have high centers of gravity or are bulky to maneuver.

Most portable sprayers without wheels use handles to carry a container and have a pump attached to supply air pressure. Many sprayers are round cylinders with centrally positioned handles that interfere with a centrally located pump. For larger capacity, these designs become tall and difficult to carry.

An extended handle permanently attached on a wheeled spray container housing is described in U.S. Pat. No. 5,429,306. This design requires more volume in the container housing to mount and store a secondary U-shape extended handle. The U-shape is necessary because this stored handle in the housing requires two supporting positions on a tank to provide stability during use. A single central handle connection in the present invention provides more maneuverability of a wheeled container in garden rows than attaching on both outside edges. Unlike this patent, the removable handle extension in the present invention does not require any modification to the container volume or add extra weight by using the carrying handle for extension handle mounting. The handle design in this U.S. Pat. No. 5,429,306 as shown in FIG. 2 results in a higher center of gravity for the liquid far above and in front of the wheels, adding more weight and stress on the double sided handle.

U.S. Pat. No. 5,072,884 portable sprayer does not have wheels and uses a generally circular vertical elliptical shape for smaller liquid quantities. Although this design may be suitable for small volume containers, It does not teach using an extended horizontal elliptical design to increase capacities and lower the center of gravity of the liquid filled container for easier handling on wheels or ease of carrying. The patent's elliptical shape is more toward the top thereby teaching away from a low center of gravity for contained liquids. Gardeners and maintenance persons appreciate light weight containers of compact design to transport or add a handle extension that provides increased mechanical advantage to easily pull or push the wheeled containers having a low center of gravity. They like the ability to both carry or wheel the container. Gardeners appreciate light weight plastic design with low center of gravity. Gardeners also would like to place multiple sprayers containing different liquids in a single cart for spraying various insecticides or other liquids while in a garden.

The present invention, using plastic in a generally elliptical shape extended horizontally, contains more liquid in a lower position that provides an easily transported apparatus by either carrying or wheeling of the low profile shape container. A separate handle extension can easily be attached to the handle providing additional leverage to move the sprayer on wheels.

SUMMARY OF THE INVENTION

The present invention is a portable wheeled apparatus for spraying liquids. The apparatus includes a liquid container having a generally elliptical shape extended horizontally with integral end caps and attached wheels, a pump for supplying air pressure into the container positioned on an end cap and extending into the container, a carrying handle, and a threaded outlet fitting. The horizontally extended elliptical design with rounded end caps provides the strength needed for large volumes of liquid in lightweight containers. This design of maintaining a large elliptical curvature on the container bottom results in a low center of gravity for the liquid so the container can be easily transported by hand or on attached wheels using the handle, or using a removable handle extension that attaches to the handle. The integral end caps add strength to the design, store liquid volume at a low position, and permit the air pump to be positioned away from the handle. The attached wheels mounted near the end caps provide an option to facilitate transporting rather than carrying, especially for larger amounts of liquid.

A handle suitable for carrying or wheeling the portable container short distances is integral in the molded plastic container and attaches to the end caps. A handle extension snaps on the handle to ease transporting the sprayer for longer distances and aid in movement during spraying. Preferably, the handle extension is a curved two piece handle, adjustably joined in the middle permitting either a normal connection or a lowered or raised connection by rotating one end 180° during handle assembling. This facilitates operation for taller or shorter people while maintaining the liquid load over the wheels for easier movement.

An air pump is mounted on an end cap and extends into the container. Pressurized air may be pumped into the container to expel the liquid under spray conditions or pressurized air may be directly forced into the container without an air pump. A short hose with a valved spray wand is normally attached to the threaded outlet fitting. This wand may be stored inside a hollowed handle extension. Multiple spraying apparatus of this design can easily be carried together in a cart for spraying different liquids at the same location.

Accordingly, an object of the invention is to use a lightweight portable wheeled liquid container having a horizontal extended, essentially elliptical shape with rounded end caps that provides a volume that contains liquid at pressures needed for spraying liquids.

Another object of the invention is to provide a portable wheeled container that maintains a large volume of liquid in a low elevation or center of gravity so transport by carrying or on wheels is easy.

Another object of the invention is to provide a portable spray container with both a carrying handle and wheels with a handle extension to facilitate moving the container by any method.

Another object of the invention is to provide a removable handle that may also be adjusted for the height of the user and maintain the liquid weight directly over the wheels for easy moving.

Another object of the invention is to store water based and organic liquids that may be pressurized and easily transported.

BRIEF DESCRIPTION OF THE DRAWINGS

The following figures together with descriptions and other information indicate the advantages and design of the present invention.

DETAILED DESCRIPTION OF THE PREFERRED EMBODIMENT

Figure 1:
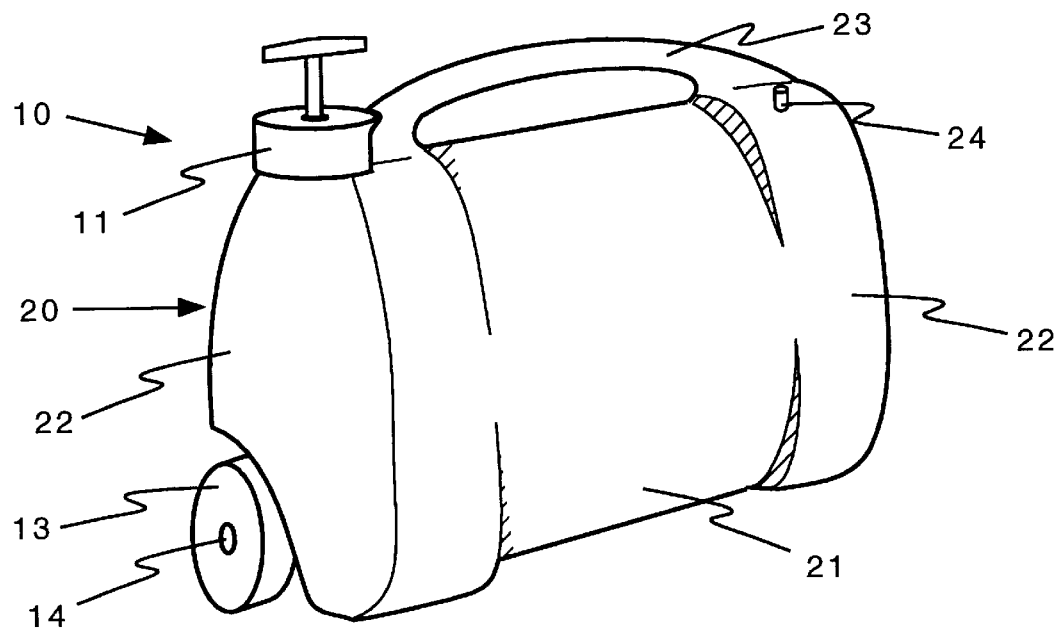
FIG. 1 shows a perspective pictorial drawing of the portable wheeled spray apparatus.

The portable wheeled spray apparatus for storing and spraying liquids is shown in the perspective drawing in FIG. 1. The complete apparatus 10 includes a liquid container 20 that stores the liquid to be sprayed under pressure, an air pump 11 that pressurizes the container, a liquid discharge connection 24, and wheels 13 with axle 14. The container center section 21 is generally an elliptical shape that extends horizontally forming a generally front view square or rectangle. The rounded end caps 22, integrally attached, add strength to the design and preferably position the means for providing air pressure into the liquid container.

A means for providing air pressure is shown to be a pump 11 for introducing compressed air connected positioned on an end cap. The means for providing air pressure or the liquid discharge attached through a connection may also be positioned on the container center section. The liquid container maintains a large storage volume near the bottom to provide a low center of gravity. Maintaining the liquid in the portable wheeled container at a low center of gravity permits easy transport of the container either by carrying or on wheels.

The portable container is fabricated from thermoplastics by roto molding or blow molding. Plastics that may be used include polyethylene, polypropylene, polystyrene, nylon, ABS, with polypropylene being preferred. The plastic may allow the liquid level to be seen through the plastic and gallon or liter marks may be added on the surface. The container volume may vary from about 1.5 gallons to more than 20 gallons with about 5 gallons being preferred. A pressure release valve may also be mounted on an end cap or center section to prevent over pressure in the container. The preferable pressure setting on the relief valve is 40 psig although lower pressures are possible. Higher pressures are possible depending upon the wall thickness used in manufacturing the container.

Figure 2:
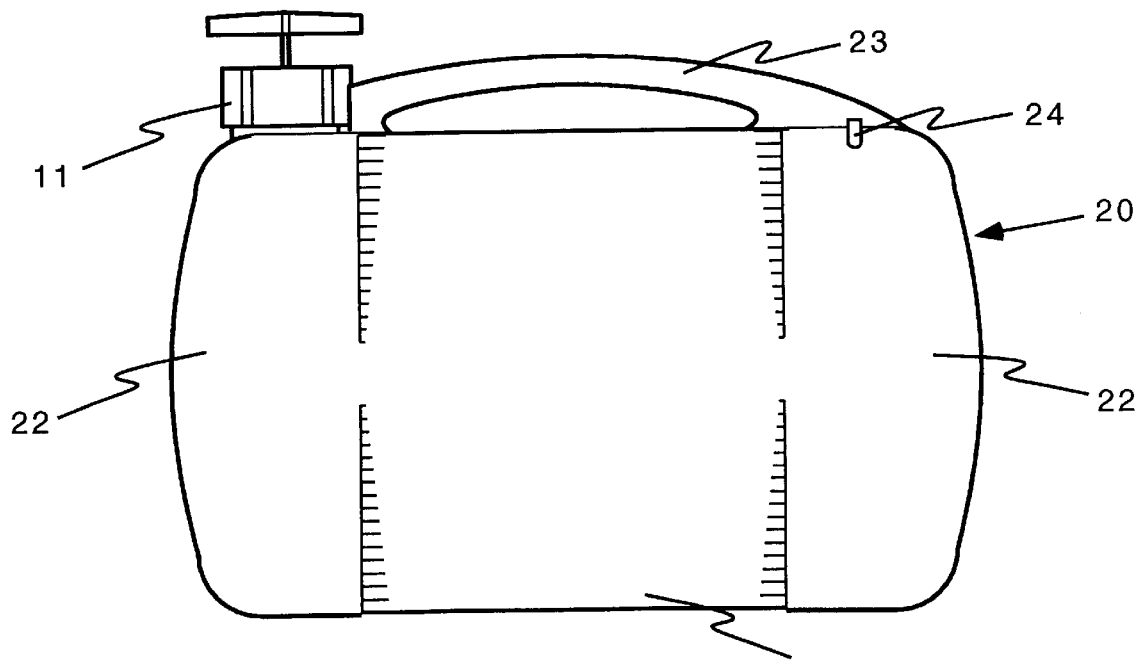
FIG. 2 shows a side view of the portable wheeled spray apparatus.
Figure 3:
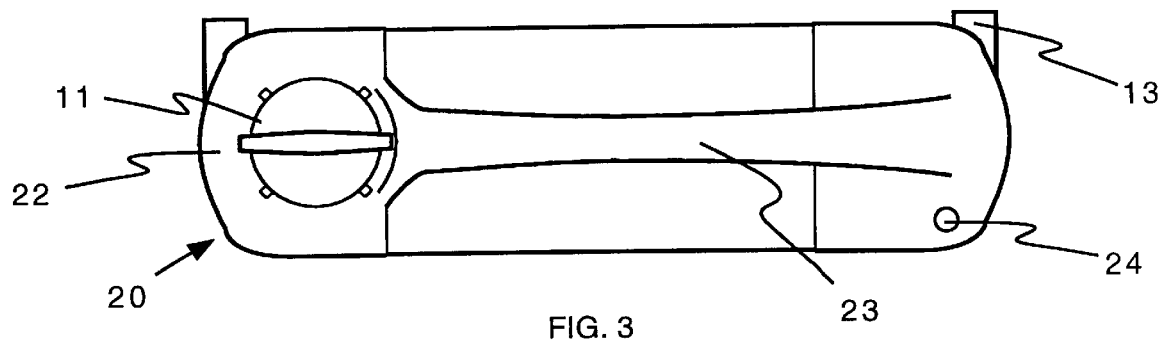
FIG. 3 shows the top view of the portable wheeled spray apparatus.

FIGS. 2 and 3 show front and top views of the portable wheeled spray apparatus. The air pump 11, as a means to provide air pressure into the container, extends into the container so air may be manually compressed into the liquid container providing pressure for liquid discharge and spray. The pump is preferably inserted and connected using an internal threaded connection in the container although external threads may also be used. The liquid may be introduced into the container through same connection.

An internal or external threaded liquid discharge connection 24 is positioned on the liquid container, preferably located in or on an end cap. This connection permits insertion of a liquid discharge tube to the bottom of the container, while sealing the container, and connects to a flexible tubing having a valved spray wand, commonly used to spray liquids. These common components are not illustrated on the drawings. Other connections such as spouts, hoses, and valves may be connected to the threaded liquid connection 24.

A carrying handle 23 is integrally attached to the container, preferably in a horizontal position on the end caps. For larger containers, the carrying handle or handles may be placed in other locations on or near the tip of the container 20.

The attached wheels 13, connected by an axle 14, are preferably mounted horizontally near the bottom of the container, along the length of the container. The axle attachment, molded in the container, is designed to act as a rupture point in the event that the pressure relief valve malfunctions. Two wheels are preferred although more may be added to the axle to ease transporting over soft soils. The design of the container is intended to maintain a low center of gravity for the liquid, directly over the wheels, for ease of movement.

Figure 4:
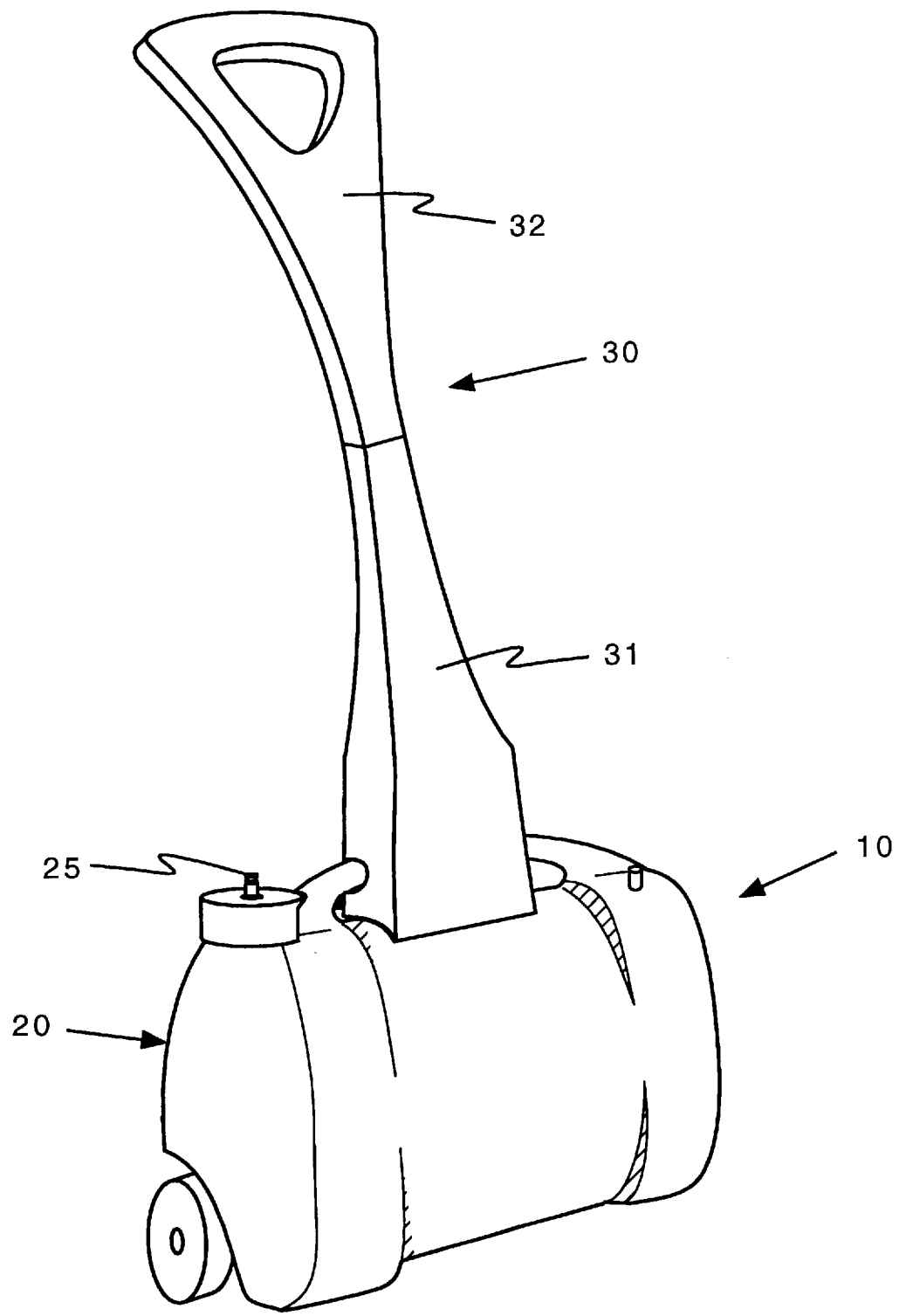
FIG. 4 shows the perspective view of the portable wheeled spray apparatus with handle extension attached.

FIG. 4 shows a perspective view of the handle extension 30 mounted to permit a mechanical advantage in moving the portable wheeled spray apparatus. The extension is a single shaft support made from molded plastic using thermoplastics described above. The attachment to the extended handle is preferably a snap in place from either side of the container handle 23 although other mounting methods such as a pin or nut and bolt may be used. The extended handle rests against container center section 21 for support and rigidity. The extended handle may be one piece, either straight or curved, or constructed by joined extended handle sections. Preferably, the handle extension is acurved two piece handle, adjustably joined in the middle permitting a normal connection as shown in FIG. 4.

Figure 5:
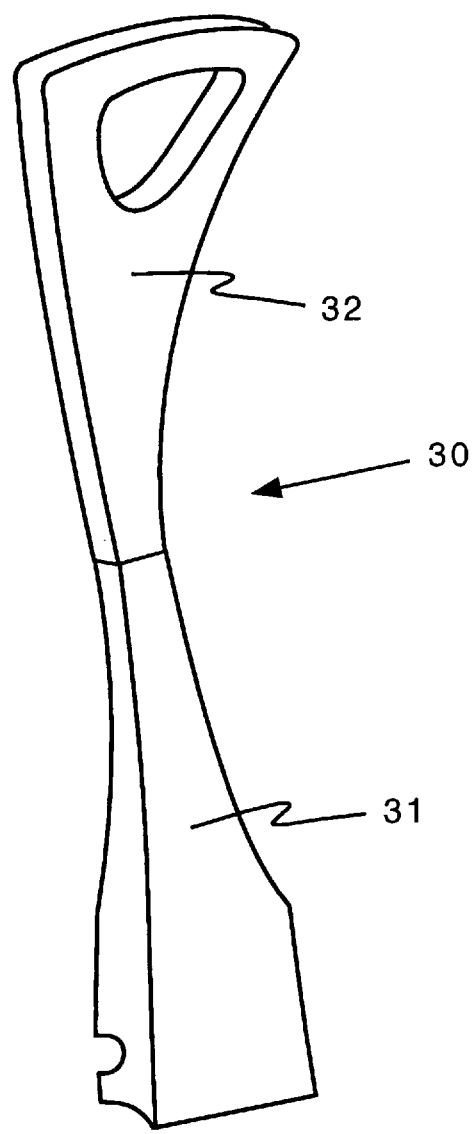
FIG. 5 shows the perspective view of the handle extension adjusted for short or tall people.

Either handle extension mounting part 31 or the handle extension with handle end 32 may be rotated 180° during handle assembling. A rotated assembly is shown in FIG. 5. Depending on the mounting side of the container handle, the extended handle position is either lowered or raised. This facilitates movement and operation of the wheeled spray apparatus for taller or shorter people while maintaining the liquid load over the wheels for easier movement. The handle part of the handle extension may contain an opening into a hollow handle permitting storage of a spray wand during transporting the portable wheeled spray apparatus.

FIG. 4 also shows a valve fitting 25 for injecting previously pressurized air into the liquid container as one means for providing pressurized air. The pump may be replaced by a threaded fitting for providing pressurized air into the liquid storage container. This fitting may adapt to the pump connection or be a separate connection.

The design of the containers permits storage of multiple sprayers in a multi-wheeled cart or the sprayer placed in a cart that transports other garden accessories or supplies. The cart may use the handle extension.

The container is designed to store both water based and organic liquids. The design easily adapts to providing showers for people while camping. Liquids that may be used in the container include pesticides, insecticides, fertilizer solutions, water, soap solutions, disinfectants and any base and acid solutions. Organic liquids including gasoline and kerosene, solvents, and other hydrocarbons or other organic liquids compatible with the plastic container may also be stored, From the above description of the invention, various changes and modifications to the apparatus will occur to those skilled in the art. All such modifications coming from within the scope of the amended claims are intended to be included therein.

I claim:

1. A portable wheeled spraying apparatus comprising:

(a) a liquid storage container having substantially a vertical elliptical shaped cross-section center that extends horizontally, (b) generally elliptical shaped end caps integrally attached to said liquid storage container center whereby rigidity and a low center of gravity for stored liquid is provided, (c) a means for providing pressurized air into said liquid storage container and providing a liquid Inlet into said liquid storage container, (d) a liquid outlet fitting on said liquid storage container, (e) a handle centrally located on top of said container, an extension having two curved pieces forming an arc, adjustably joined to an extension middle whereby the extension end position is lowered or raised and, (f) wheels horizontally mounted near bottom of said liquid storage container.

* * * * *